Patented Feb. 27, 1951

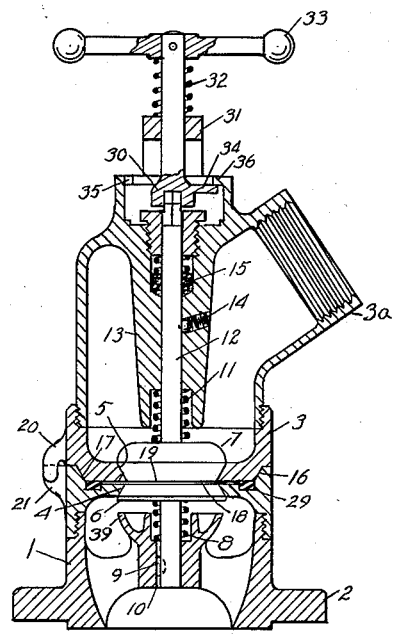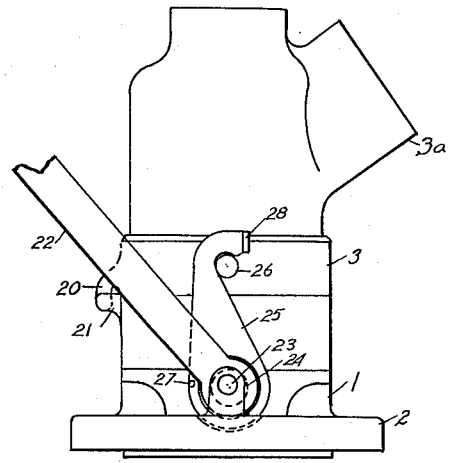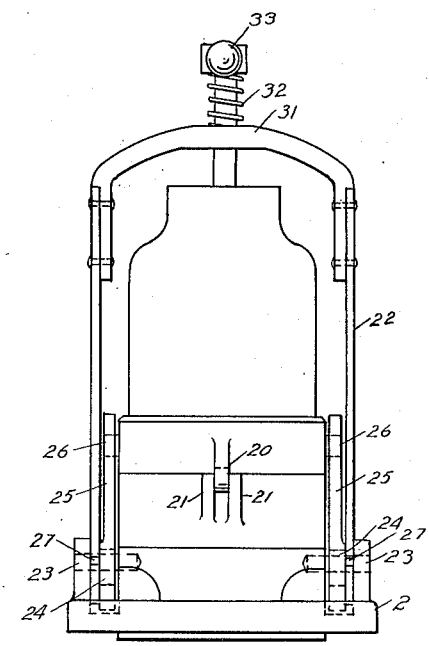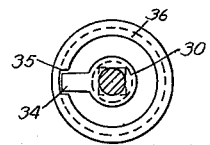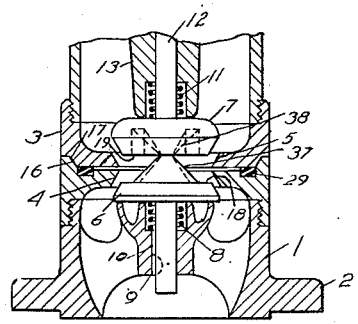

2,543,589

UNITED STATES PATENT OFFICE 2,543,589

VALVED COUPLING

Raymond A. Newcomb, Erie, Pa., assignor to Erie Meter Systems, Inc., Erie, Pa., a corporation of Pennsylvania Application February 20, 1945, Serial No. 578,837

8 Claims. (Cl. 284—18)

The present invention relates to detachable couplings for fluid lines with interlocked valves to prevent leakage as the coupling connection is broken. One use of the couplings is in gasoline lines where even a small amount of leakage is not permissible. Among the features preventing this undesirable leakage are the close spacing of the valves, the nesting of the cam operating surfaces of the valves, and the location of valves in a well retaining the fluid between the valves. Further objects and advantages appear in the specification and claims.

In the accompanying drawing, Fig. 1 is a sectional elevation of the coupling with the coupling members in the engaged position and the valves closed; Fig. 2 is a side elevation; Fig. 3 is a front elevation; Fig. 4 is a detail of the top of one of the coupling members showing the interlock; and Fig. 5 is a fragmentary elevation, similar to Fig. 1, showing the valves open.

The coupling comprises a member 1 having a coupling flange 2 and a mating member 3 having a threaded coupling 3a. The coupling member 1 is ordinarily connected to the fixed part of the fluid line and the coupling member 3 is connected to the part of the fluid line which is to be detached.

The coupling members have ports 4 and 5 normally closed by poppet valves 6 and 7 so that the flow of fluid through the coupling members is prevented when the coupling connection is disconnected. The poppet valve 6 for the coupling member 1 is biased against its seat by a coil spring 8 and is prevented from turning by a key 9 slidable in a key-way 10. The poppet valve 7 is biased against its seat by a coil spring 11 surrounding a valve stem 12 rotatable in a boss 13 and yieldably held against rotation by a detent 14. Suitable packing for the valve stem is indicated at 15. The coupling member 1 is provided with a beveled seat 16 for receiving a mating projection 17 on the coupling member 3. The sides of the seat 16 extend above the closely spaced surfaces 18, 19 of the poppet valves 6 and 7. When the valves are closed, the small amount of fluid between the surfaces 18 and 19 is held in the well provided by the beveled seat 16. The structure is such that this amount of fluid can be kept to a negligible quantity.

The coupling member 3 is provided with a lug 20 received between ears 21 on the coupling member 1 and angularly locating the coupling members so that the coupling connection can be made only when the members are in one position. After the coupling member 3 is located, it is locked against the mating coupling member by a bail 22 fixed to shafts 23 journaled in the coupling member 1. On the shafts are eccentrics 24 rotatably carrying hooks 25 which hook over projections 26 on the coupling member 3 and secure the coupling members together. Pins 27 and lugs 28 provide for limited turning of the hooks with respect to the bail. Upon rotation of the bail to the upright position illustrated in Fig. 2, the eccentrics 24 cam the hooks 25 downwardly, forcing the coupling member 3 tightly against the coupling member 1 and compressing a gasket 29 sealing the space around the valves.

In the upright or locked position of the bail, a key or socket 30 is opposite the squared upper end of the valve stem 12. The key is normally held against the top 31 of the bail by a coil spring 32 arranged between the top of the bail and a handle 33.

When the handle is in the position corresponding to closure of the valves, a projection 34 on the key is directly above and registering with a notch 35 in a flange 36 surrounding and slightly above the upper end of the valve stem 12. When the handle is depressed to bring the key into engagement with the upper end of the valve stem, the projection 34 passes through the notch 35 so that upon turning the handle to open the valves the projection is received beneath the flange 36 which holds the key in engagement with the valve stem. The key cannot be disengaged from the valve stem until the handle is returned to the closed position.

The valve 6, which is held against rotation by the key 9, is provided with inclined cam surfaces 37 projecting from the surface 18 which engage a complementary cam surface 38 projecting from the surface 19 of the valve 7. It will be noted that the cam surfaces are nested so as to require a minimum of space. Upon turning of the handle 33, the valve 7 is rotated with respect to the valve 6 and the valves are cammed apart by the surfaces 37 and 38. In the open position the valve 7 is stopped by engagement with the lower end of the boss 13 and the valve 6 is stopped by engagement with a flange 39. Upon turning the handle to the closed position, the springs 8 and 11 close the valves. During closure the fluid between the valves is squeezed out in the space between the valves and the ports 4 and 5.

In the use of the couplings, the coupling connection is made by locating the coupling member 3 on the coupling member 1, moving the hooks 25 to the position shown in Fig. 2, and swinging the bail 22 to the upright position to lock the coupling members together. The handle 33 can then be depressed and turned to open the valves 4 and 5. The coupling connection is broken by first closing the valves by turning the handle 33 to the position in which the projection 34 is opposite the slot 35 releasing the handle to permit movement of the key 30 to a position above the flange 36 swinging the bail 22 to the position of Fig. 2, in which the hooks 25 are lifted above the pins 26 and continuing the downward swinging of the bail to release the hooks due to engagement of the bail with the pins 27.

It should be noted that a positive interlock is provided in the couplings requiring closure of the valves before the coupling connection in broken. When the connection is broken, only a negligible amount of fluid is exposed and this is retained in a well so none is spilled.

What I claim as new is:

1. A detachable coupling having mating members for connection in a fluid line, locking means connecting the coupling members together, opposed poppet valves biased against seats in the respective members, one of the valves being rotatable relative to the locking means, and cams on the valves effective upon relative rotation of the valves to move the valves away from the seats.

2. A detachable coupling having mating members for connection in a fluid line, opposed valves on the respective members, and cams on the respective valves effective upon relative rotation to open and close the valves, the cams being nested in one of the valves.

3. A detachable coupling having mating members for connection in a fluid line, means for locking the parts including a bail on one of the parts movable to and from a locked position, valves on the respective parts, valve operating means, and an interlock between the bail and valve operating means preventing opening of the valves except when the bail is in the locked position.

4. A detachable coupling having mating members for connection in a fluid line, means for locking the parts including a bail on one of the parts movable to and from a locked position, valves on the respective parts, and valve operating means carried by the bail and moved into operating position by movement of the bail to the locked position.

5. A detachable coupling having mating members for connection in a fluid line each having a valve, releasable means locking the members together, operating means for the valves, and an interlock between the locking means and the valve operating means compelling locking of the members prior to starting opening the valves and closing the valves prior to unlocking the members.

6. A coupling comprising a pair of complementary casings each having a port therein for fluid flow therethrough, means for detachably locking said casings together, a valve member mounted in one of said casings for movement between two distinct positions relative to its port, valve operating means operable separate from the operation of the locking means, an interlocking means cooperating between said locking means and said valve operating means for preventing unlocking operation of said locking means when said valve member is disposed in one of said positions but permitting unlocking operation of said locking means when said valve member is disposed in said other position.

7. A coupling comprising a pair of complementary casings each having a port therein for fluid flow therethrough, a clamp rotatably mounted on one of said casings for clamping the casings together, said clamp being constructed and arranged to engage the other of said casings in clamping relation in a first rotative position and to disengage the other casing in a second rotative position, a valve member mounted in one of said casings for movement between open and closed position relative to its port, and an interlocking plunger between the clamp and the valve member and cooperating with the clamp to block uncoupling operation of the clamp when the valve is in its open position, said plunger being movable clear of the position blocking uncoupling operation of the clamp when the valve is in its closed position.

8. A detachable coupling for a fluid line having mating members, one for connection to the fixed part of the fluid line and the other of which is detachable therefrom, ports in said members, valves in said members movable between open and closed positions relative to the respective ports, means for clamping the members together, valve operating means mounted on said one member for moving its valve to the open position, a connection between the valve operated by the operating means and the other valve compelling movement of the other valve to the open position, an interlock on said one member cooperating with the clamping means to prevent uncoupling operation of the clamping means when the operated valve is in the open position and permitting uncoupling operation of the clamping means when the operated valve is in its closed position.

RAYMOND A. NEWCOMB.

REFERENCES CITED

The following references are of record in the file of this patent:

UNITED STATES PATENTS

| Number | Name | Date |
|---|---|---|
| 1,000,945 | Ray | Aug. 15, 1911 |
| 1,767,391 | Muller | June 24, 1930 |
| 1,952,110 | Baker | Mar. 27, 1934 |
| 2,120,677 | Oliver | June 14, 1938 |
| 2,147,084 | Bouchard | Feb. 14, 1939 |
| 2,225,838 | Miller | Dec. 24, 1940 |
| 2,286,623 | Kellaher et al. | June 16, 1942 |
| 2,326,143 | Hufferd | Aug. 10, 1943 |
| 2,393,489 | Trautman | Jan. 22, 1946 |
| 2,426,471 | Snyder | Aug. 26, 1947 |
| 2,436,327 | Pommer | Feb. 17, 1948 |